(12) United States Patent
Song

(10) Patent No.: US 9,589,167 B2
(45) Date of Patent: Mar. 7, 2017

(54) GRAPHICAL CODE PROCESSING METHOD AND APPARATUS

(71) Applicant: Tencent Technology (Shenzhen) Co., Ltd., Shenzhen, Guangdong (CN)

(72) Inventor: Zhigang Song, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/165,588

(22) Filed: May 26, 2016

(65) Prior Publication Data

US 2016/0275327 A1 Sep. 22, 2016

Related U.S. Application Data

(63) Continuation-in-part of application No. PCT/CN2014/093676, filed on Dec. 12, 2014.

(30) Foreign Application Priority Data

Dec. 26, 2013 (CN) .......................... 2013 1 07328296

(51) Int. Cl.
*G06K 7/14* (2006.01)
*G06F 9/445* (2006.01)
*G06F 17/27* (2006.01)

(52) U.S. Cl.
CPC .............. *G06K 7/1417* (2013.01); *G06F 8/61* (2013.01); *G06F 9/445* (2013.01); *G06F 17/2705* (2013.01)

(58) Field of Classification Search
CPC ........ G06F 17/2705; G06F 8/61; G06F 9/445; G06K 7/1417
See application file for complete search history.

(56) References Cited

U.S. PATENT DOCUMENTS 7,647,562 B2  1/2010 Ghercioiu et al.
2004/0199897 A1 10/2004 Ghercioiu et al.
(Continued)

FOREIGN PATENT DOCUMENTS

CN   1635813 A   7/2005
CN   103414765 A  11/2013

OTHER PUBLICATIONS

First Chinese Office Action received in Chinese Application No. 2013107328296 dated Dec. 26, 2013.
(Continued)

*Primary Examiner* — Sonji Johnson
(74) *Attorney, Agent, or Firm* — Brinks, Gilson & Lione

(57) ABSTRACT

A graphical code processing method and apparatus are disclosed. The method includes: acquiring a predetermined graphical code, wherein the predetermined graphical code carries: an identification of a predetermined application program corresponding to the predetermined graphical code, a call address of the predetermined application program, and content data; parsing the identification of the predetermined application program, the call address of the predetermined application program and the content data from the predetermined graphical code; and detecting whether the identification of the predetermined application program matches an identification of a current application program. If the detection shows that the identification a the predetermined application program does not match the identification of the current application program, calling the predetermined application program according to the call address of the predetermined application program to perform corresponding, operations on the content data in the predetermined graphical code.

15 Claims, 5 Drawing Sheets

(56) References Cited

U.S. PATENT DOCUMENTS

| | | | |
|---|---|---|---|
| 2011/0014905 A1* | 1/2011 | Eschenauer | G06Q 10/06 455/418 |
| 2011/0068175 A1* | 3/2011 | Powers | G06K 7/14 235/462.25 |
| 2012/0205436 A1 | 8/2012 | Thomas et al. | |
| 2013/0018701 A1* | 1/2013 | Dusig | G06Q 30/02 705/7.32 |
| 2014/0124580 A1* | 5/2014 | Yang | G06K 7/1417 235/462.1 |

OTHER PUBLICATIONS

International Search Report and Written Opinion received in PCT Application No. PCT/CN2014/093676 dated Mar. 2, 2015.

\* cited by examiner

GRAPHICAL CODE PROCESSING METHOD AND APPARATUS

CROSS-REFERENCE TO RELATED APPLICATIONS

The application is a continuation of PCT Application No. PCT/CN2014/093676, filed on Dec. 12, 2014, which claims priority to Chinese Patent Application No. 2013107328296, filed on Dec. 26, 2013, which is incorporated by reference in their entireties.

FIELD OF THE TECHNOLOGY

The present disclosure relates to the field of Internet technologies, and particularly to a graphical code processing method and apparatus.

BACKGROUND

With rapid development of mobile Internet, disseminating or sharing information through graphical codes is increasingly becoming more widespread. Many businesses have developed a variety of application programs to disseminate their products or services mostly in a form of graphical codes by application programs.

Application programs developed by those businesses which disseminate their products or services in the form of graphical codes uses corresponding rules when generating content data of graphical codes, in existing graphical code recognition technology, when a certain application program scans a graphical code, content data may be parsed from the graphical code, where the content data may be generated according to a rule corresponding, to the application program; and then the application program may directly perform related service operations according to the content data of the graphical code. For example, an instant messaging program may scan a two-dimensional code, where data carried in the two-dimensional code may be data concerning providing a public number generated according to a rule corresponding to the instant messaging program. At that time, the instant messaging program may directly perform providing operation to the public number according to the content data.

The above graphical code recognition technology has at least the following problems: when a current application program may scan a graphical code, and parse content data from the graphical code which are generated according to the rule of another application program (instead of according to rules of the current application program), but the current application program may not perform related operations on the content data, resulting in poor compatibility.

SUMMARY

In order to solve the problem in the prior art that, when a current application program can parse content data in a graphical code, but the content data are content data generated according to a rule of another application program, the current application program may not perform related operations on the content data, resulting in poor compatibility, embodiments of the present disclosure provide a graphical code processing method and apparatus. The technical solution is as follows:

An embodiment of the disclosure discloses a graphical code processing method, the method include the following operations:

acquiring a predetermined graphical code, wherein the predetermined graphical code carries at least: an identification of a predetermined application program corresponding to the predetermined graphical code, wherein the identification is used for uniquely identifying the predetermined application program in an operating system; a call address of the predetermined application program, wherein the call address is a call address of the predetermined graphical code in the operating system; and content data, wherein the content data are data generated according to a rule corresponding to the predetermined application program; parsing the identification of the predetermined application program, the call address of the predetermined application program and the content data from the predetermined graphical code; and detecting whether the identification of the predetermined application program matches an identification of a current application program; if a detection result shows that the identification of the predetermined application program does not match the identification of the current application program, calling the predetermined application program according to the call address of the predetermined application program in order to perform corresponding operations on the content data in the predetermined graphical code.

Another embodiment of the disclosure discloses a graphical code processing apparatus, wherein the apparatus includes at least a processor with circuitry operating in conjunction with at least a memory which stores instruction codes operable as plurality of modules, wherein the plurality of modules include:

a graphical code acquisition module, which causes the processor to perform: acquiring a predetermined graphical code, wherein the predetermined graphical code carries at least: an identification of a predetermined application program corresponding to the predetermined graphical code, wherein the identification is used for uniquely identifying the predetermined application program in an operating system; a call address of the predetermined application program, wherein the call address is a call address of the predetermined graphical code in the operating system; and content data, wherein the content data are data generated according to a rule corresponding to the predetermined application program; a graphical code parsing module, which causes the processor to perform: parsing the identification of the predetermined application program, the call address of the predetermined application program and the content data from the predetermined graphical code; an identification detection module, which causes the processor to perform: detecting whether the identification of the predetermined application program matches an identification of a current application program; and an application calling module, which causes the processor to perform: calling the predetermined application program according to the call address of the predetermined application program in order to perform corresponding operations on the content data in the predetermined graphical code, if a detection result shows that the identification of the predetermined application program does not match the identification of the current application program.

Yet another embodiment of the disclosure discloses a non-transitory computer-readable storage medium, wherein the computer readable storage medium stores a program which comprises codes or instructions to cause a processor circuitry to execute operations for processing graphical code, the operations including:

acquiring as predetermined graphical code, wherein the predetermined graphical code carries at least: an identification of a predetermined application program corresponding to the predetermined graphical code, wherein the identification is used for uniquely identifying the predetermined application program in an operating system; a call address of the predetermined application program, wherein the call address is as call address of the predetermined graphical code in the operating system; and content data, wherein the content data are data generated according to as rule corresponding to the predetermined application program; parsing the identification of the predetermined application program, the call address of the predetermined application program and the content data from the predetermined graphical code; and detecting whether the identification of the predetermined application program matches an identification of a current application program; if a detection result shows that the identification of the predetermined application program does not match the identification of the current application program, calling the predetermined application program according to the call address of the predetermined application program in order to perform corresponding operations on the content data in the predetermined graphical code.

As pointed out, the prior art method has the problem of a current application program may scan a graphical code, and parse content data from the graphical code which are generated according to the rule of another application program (instead of according to rules of the current application program), but the current application program may not perform related operations on the content data, resulting in poor compatibility. The technical solution provided in the embodiments of the present disclosure may solve the following compatibility problem of even if the content data carried in the graphical code may be content data generated according to the rule of another application program, the current application program may call the corresponding another application program to process the content data, thereby solving the current application program's compatibility issue with the another application program.

BRIEF DESCRIPTION OF THE DRAWINGS

The accompanying drawings may be included to provide further understanding of the claims and disclosure which may be incorporated in, and constitute a part of this specification. The detailed description and illustrated embodiments described may serve to explain the principles defined by the claims.

DETAILED DESCRIPTION

The various embodiments of the present disclosure may be further described in details in combination with attached drawings and embodiments below. It should be understood that the specific embodiments described here may be used only to explain the present disclosure, and may be not used to limit the present disclosure. In addition, for the sake of keeping description brief and concise, the newly added features, or features that may be different from those previously described in each new embodiment will be described in details. Similar features may be referenced back to the poor descriptions in a prior numbered drawing or referenced ahead to a higher numbered drawing.

In order to clarify the object, technical scheme and advantages of the present disclosure more specifically, the present disclosure may be illustrated in further details with the accompanied drawings and embodiments. It should be understood that the embodiments described herein may be merely examples to illustrate the present disclosure, but not to limit the present disclosure.

Figure 1:
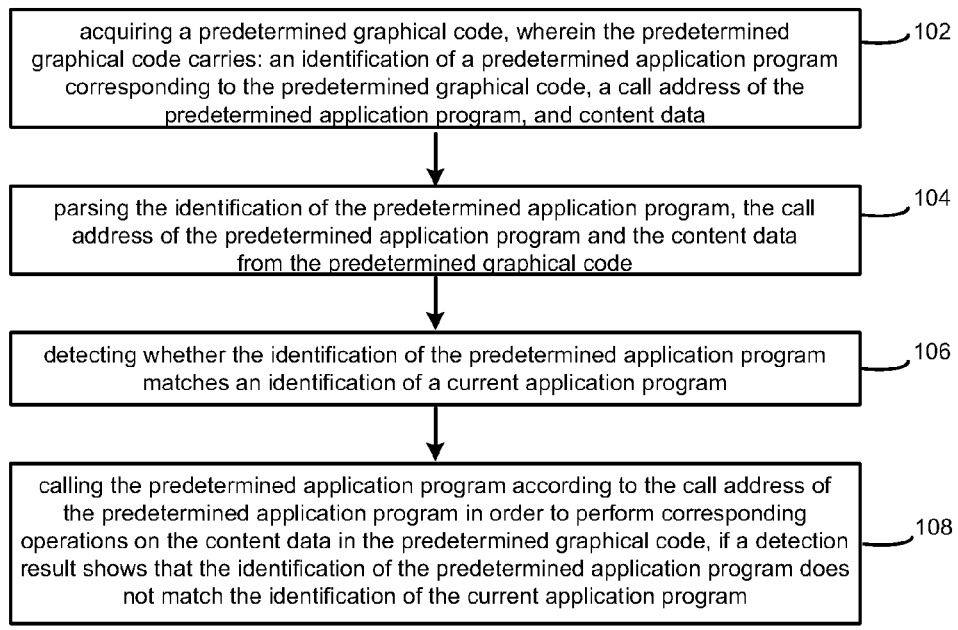
FIG. 1 is a flowchart illustrating an exemplary graphical code processing method, according to an embodiment of the disclosure.

FIG. 1 is a flowchart illustrating an exemplary graphical code processing method, according to an embodiment of the disclosure. The graphical code processing method may include the following exemplary operations or steps.

Step 102: acquiring a predetermined graphical code, wherein the predetermined graphical code carries at least: an identification of a predetermined application program corresponding to the predetermined graphical code, a call address of the predetermined application program, and content data.

The graphical code may be a two-dimensional code, or may be another graphical code that can carry data information. As application fields of the graphical code are more and more widespread, representations may be more abundant and not limited to a two-dimensional code. Wherein the identification is used for uniquely identifying the predetermined application program in an operating system, the call address is a call address of the predetermined graphical code in the operating system, through the call address, an application program corresponding thereto may be called and the content data of the graphical code may be transmitted to the application program, and the content data are data generated according to a rule corresponding to the predetermined application program. The content data are data generated according to a rule corresponding to the predetermined application program.

Step 104: parsing the identification of the predetermined application program, the call address of the predetermined application program and the content data from the predetermined graphical code.

Step 106: detecting whether the identification of the predetermined application program matches an identification of a current application program.

Step 108: calling the predetermined application program according to the call address of the predetermined application program in order to perform corresponding operations on the content data in the predetermined graphical code, if a detection result shows that the identification of the predetermined application program does not match the identification of the current application program.

To sum up, the graphical code processing method according to this embodiment may solve the compatibility problem of even if the content data carried in the graphical code may be content data generated according to the rule of another application program, the current application program may call the corresponding another application program to process the content data, thereby solving the current application program's compatibility issue with the another application program.

Figure 2A:
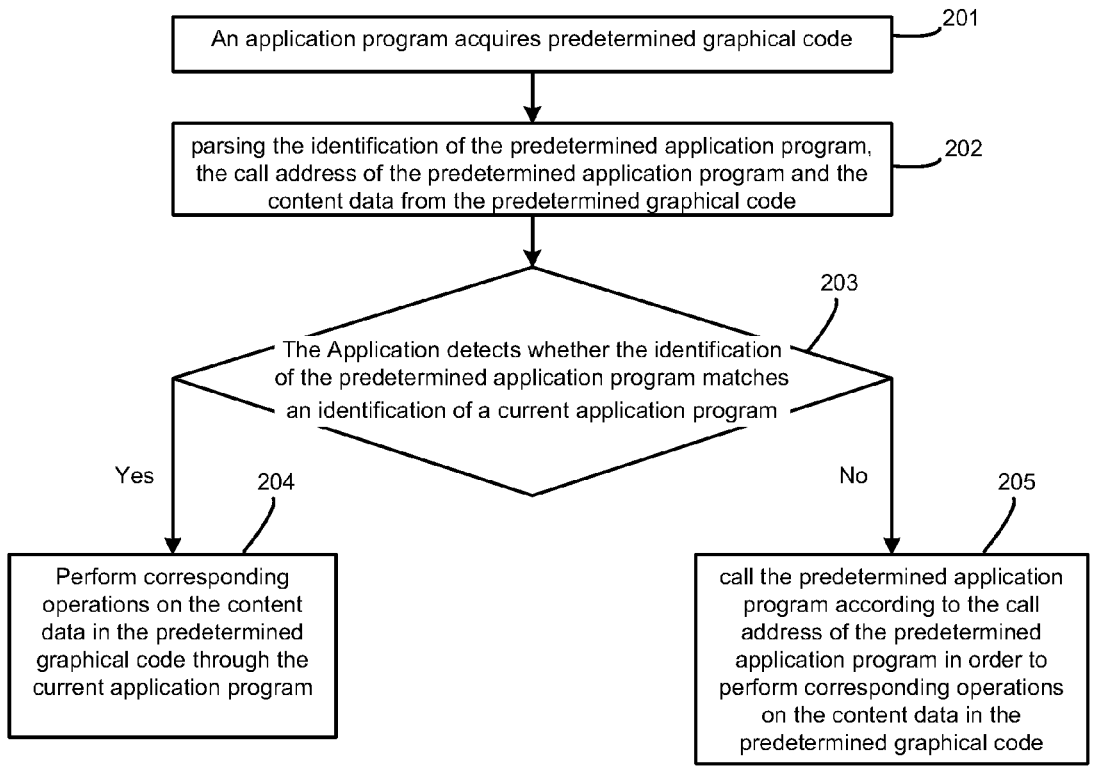
FIG. 2A is a flowchart illustrating an exemplary graphical code processing method, according to another embodiment of the disclosure.
Figure 2B:
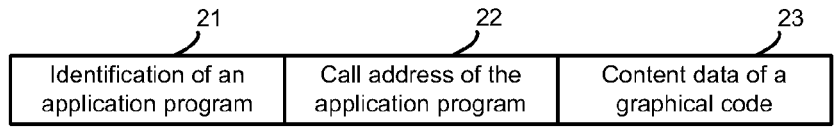
FIG. 2B depicts exemplary content carried in a graphical code, according to an embodiment of the disclosure.

FIG. 2 is a flowchart illustrating an exemplary graphical code processing method, according to another embodiment of the disclosure. The graphical code processing method may include the following operations or steps:

Step 201: an application program may acquire a predetermined graphical code, where the predetermined graphical code may carry; an identification of a predetermined application program corresponding to the predetermined graphical code, a call address of the predetermined application program and content data, as shown in FIG. 2B.

FIG. 2B is a simple schematic view of content carried in a graphical code, including an identification (21) of an application program, as call address (22) of the application, program and content data (23) of the graphical code. The graphical code may be a two-dimensional code, or may be another graphical code that can carry data information.

The predetermined graphical code may carry an identification of a predetermined application program corresponding to the predetermined graphical code, a call address of the predetermined application program and content data. The identification is used for uniquely identifying the predetermined application program in an operating system, the call address is a call address of the predetermined graphical code in the operating system, through the call address, an application program corresponding thereto may be called and the content data of the graphical code may be transmitted to the application program, and the content data may be data generated according to a rule corresponding to the predetermined application program.

For example, suppose that a certain payment graphical code may carry "Zhifu.app&callinglocation52364&gdhf4523," were "Zhifu.app" may be a unique identification of a payment application program in an operating system, "callinglocation5236" may be a call address of the payment application program in the operating system, "gdhf4523" are content data carried in the payment graphical code. The content data may be a piece of order information, and the order information may include order number, name of commodity, the amount of commodity, seller account, buyer account and the like.

Step 202: parsing, the identification of the predetermined application program, the call address of the predetermined application program and the content data from the predetermined graphical code.

The application program may parse the identification of the predetermined application program, the call address of the predetermined application program and the content data from the predetermined graphical code. After acquiring the predetermined graphical code, the application program may parse the identification of the predetermined application program, the call address of the predetermined application program and the content data from the predetermined graphical code for further use. It may be helpful to point out that, an application program may only parse the content data carried therein from the predetermined graphical code.

Meanwhile, the content data parsed by the application program may merely be a character string, but the application program may not acquire an overall specific content from the predetermined graphical code. For example, if the predetermined graphical code is a payment graphical code, the application program may only acquire content data carried in the payment graphical code, but not necessarily payment-related order information etc.

Step 203: detect whether the identification of the predetermined application program matches an identification of a current application program.

The application program may detect whether the identification of the predetermined application program matches an identification of a current application program. Since the content data in the predetermined graphical code may not necessarily be generated according to a rule of the current application program, the current application program, therefore, prior to using the content data of the predetermined graphical code, it may be necessary to detect whether the identification of the predetermined application program corresponding to the predetermined graphical code may match an identification of the current application program.

Step 204: perform corresponding operations on the content data in the predetermined graphical code through the current application program according to a rule corresponding to the current application program, if a detection result shows that the identification of the predetermined application program matches the identification of the current application program.

Processing the content data in the predetermined graphical code may mean that the predetermined application program both recognizes the content data in the predetermined graphical code according to the rule corresponding to the predetermined application program, and performs corresponding operations according to the content data. For example, if the content data in the predetermined graphical code are content data which are relevant to a public account, an operation of paying attention to the public account may be executed after the public account corresponding to the content data may be recognized. If the content data in the predetermined graphical code are content data relevant to a payment, a payment-related operation may be executed after order information in the content data of the payment may be recognized.

Corresponding operations are performed on the content data in the predetermined graphical code according to a rule corresponding to the current application program through the current application program if a detection result shows that the identification of the predetermined application program matches the identification of the current application program. If the detection result shows that the identification of the predetermined application program matches the identification of the current application program, it may indicate that the content data in the predetermined graphical code may be generated according to a rule of the current application program. Accordingly, the current application program may identify the content data in the predetermined graphical code and perform corresponding operations.

Step 205: call the predetermined application program according to the call address of the predetermined application program to perform corresponding operations on the content data in the predetermined graphical code, if the detection result shows that the identification of the predetermined application program does not match the identification of the current application program.

The application program may call the predetermined application program according to the call address of the predetermined application program to perform corresponding operations on the content data in the predetermined graphical code, if the detection result shows that the identification of the predetermined application program does not match the identification of the current application program. If the detection result shows that the identification of the predetermined application program does not match the identification of the current application program, it may indicate that the predetermined, graphical code may not be generated according to the rule of the current application program; therefore, the current application program may not recognize the content data of the predetermined graphical code, and the current application program may need to call the predetermined application program according to the call address of the predetermined application program to process the content data in the predetermined graphical code.

Figure 2C:
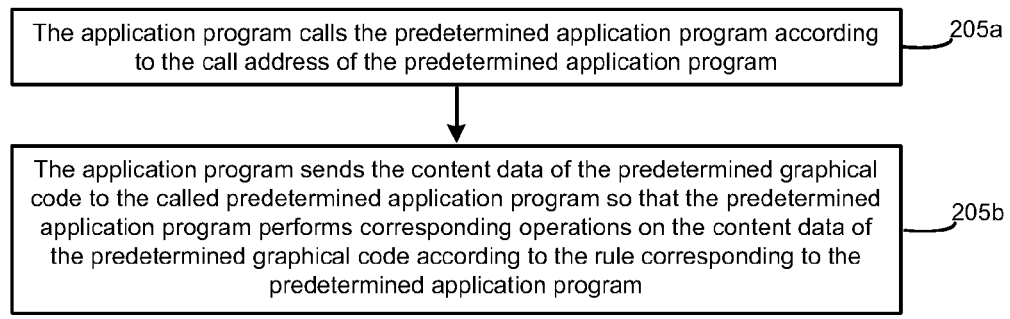
FIG. 2C is a flowchart illustrating an exemplary graphical code processing method, according to another embodiment of the disclosure.

As shown FIG. 2C, specifically, step 205 may further include the following sub-steps:

Step 205*a*: the application program may call the predetermined application program according to the call address of the predetermined application program; and Step 205*b*: the application program sends the content data of the predetermined graphical code to the called predetermined application program, so that the predetermined, application program may perform corresponding operations on the content data of the predetermined graphical code according to the rule corresponding to the predetermined application program.

As the predetermined graphical code being acquired through the current application program, the current application program may need to send the content data of the predetermined graphical code to the predetermined application program, and correspondingly, the predetermined application program may recognize the content data in the predetermined graphical code according to the rule corresponding to the predetermined application program and may perform corresponding operations. In addition, the current application program may also send all data in the predetermined graphical code to the predetermined application program without limiting in the disclosed embodiment.

Figure 2D:
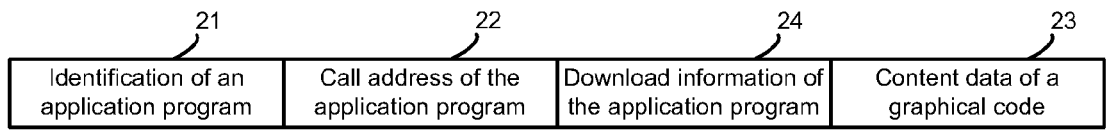
FIG. 2D depicts exemplary content carried in a graphical code, according to another embodiment of the disclosure.

It may be necessary to point out that, as shown in FIG. 2D, the predetermined graphical code may further carry a download information of the predetermined application program, and the predetermined graphical code carries the identification (21) of the predetermined application program corresponding to the predetermined graphical code, the call address (22) of the predetermined application program, the download information (24) of the predetermined application program and the content data (23) of the graphical code. For example, "zhifu.app&callinglocation5236&www.download123.com/123456&gdhf4523" may be a payment graphical code, which carries "Zhifu.app" as a unique identification of a payment application program in an operating system, "callinglocation5236" as a call address of the payment application program in the operating system, and "www.download123.com/123456" as a download address of the payment application program. "gdbf4523" are content data of the payment graphical code, and the content data may include order information, and the order information includes order number, name of commodity, the amount of commodity, seller account, buyer account, etc.

Figure 2E:
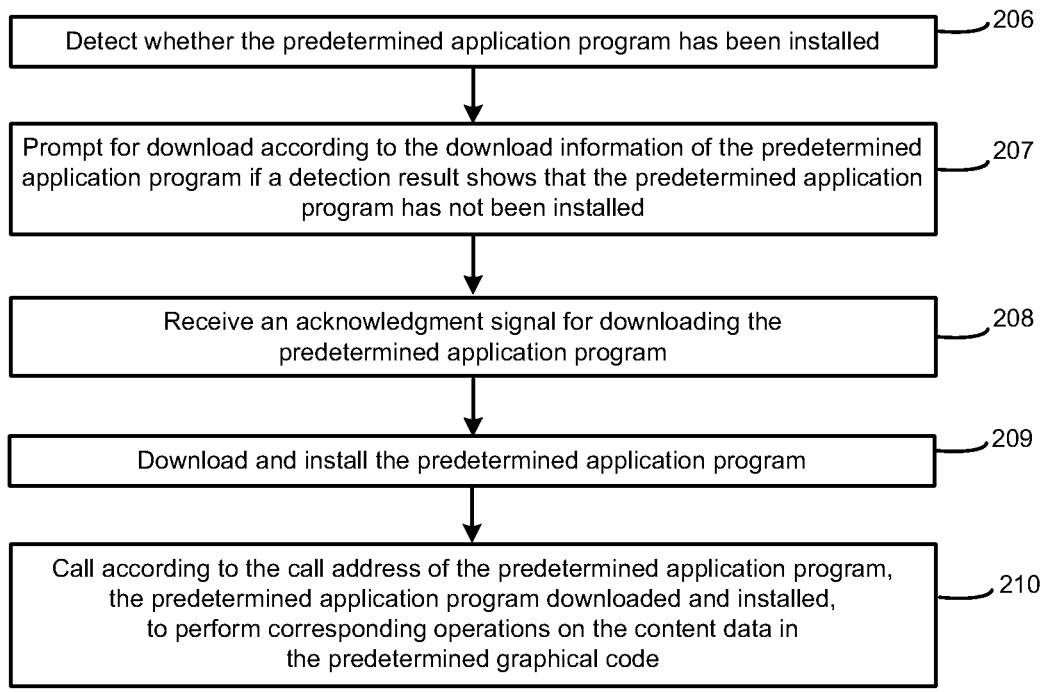
FIG. 2E is a flowchart illustrating an exemplary graphical code processing method, according to another embodiment of the disclosure.

As shown in FIG. 2E, if the predetermined graphical code further carries download information of the predetermined application program, prior to performing step 205, i.e., prior to the application program calling the predetermined application program according to the call address of the predetermined, application program to process the content data in the predetermined graphical code, the method ma further include the following steps.

Step 206: detect whether the predetermined application program has been installed.

The application program may detect whether the predetermined application program has been installed in a system according to the identification of the predetermined application program.

Step 207: prompt for download according to the download information of the predetermined application program, if a detection result shows that the predetermined application program has not been installed.

The application program prompts for download according to the download information of the predetermined application program, if a detection result shows that the predetermined application program has not been installed. The application program may also open a download interface for downloading the predetermined application program through a built-in weld browsing program according to the download information of the predetermined application program. The application program may also call an external browser application program to open a webpage corresponding to the download information of the predetermined application program, and the application program may further call an application program, such as an application available in the market to download the predetermined application program. The choice of the application program is not limiting.

Step 208: receive an acknowledgement signal for downloading the predetermined application program. The application program may receive an acknowledgement signal for downloading the predetermined application program in the download interface for downloading the predetermined application program opened by the built-in webpage browsing program of the application program.

Step 209: download and install the predetermined application program. After the acknowledgement signal for downloading the predetermined application program is received in the download interface, the predetermined application program is downloaded and installed.

Step 210: call the predetermined application program downloaded and installed according to the call address of the predetermined application program to perform corresponding operations on the content data in the predetermined graphical code.

The application program may call the predetermined application program downloaded and installed according to the call address of the predetermined application program, and the called predetermined application program may perform corresponding operations on the content data in the predetermined graphical code according to the rule corresponding to the predetermined application program. That the predetermined application program processes the content data in the predetermined graphical code may include the following content: if the predetermined graphical code is a graphical code of a public account, attention may be paid to the public account; if the predetermined graphical code is a payment graphical code, a payment operation may be performed; if the predetermined graphical code is a graphical code of a shopping link, commodity information may be browsed. The described embodiments are exemplary illustrations without being limiting.

It should be noted that, step 207 to step 210 may be performed prior to step 205, but if the application program detects that the predetermined application program has been installed in step 207, then step 205 may be directly performed.

As seen, the graphical code processing method by detecting whether the predetermined application program has been installed; prompting for download according to the download information of the predetermined application program if a detection result shows that the predetermined application program has not been installed, and downloading and installing the predetermined application program, may solve the compatibility problem of even if the content data carried in the graphical code may be content data generated according to the rule of another application program, the current application program may call the corresponding another application program to process the content data, thereby solving the current application program's compatibility issue with the another application program.

Figure 2F:
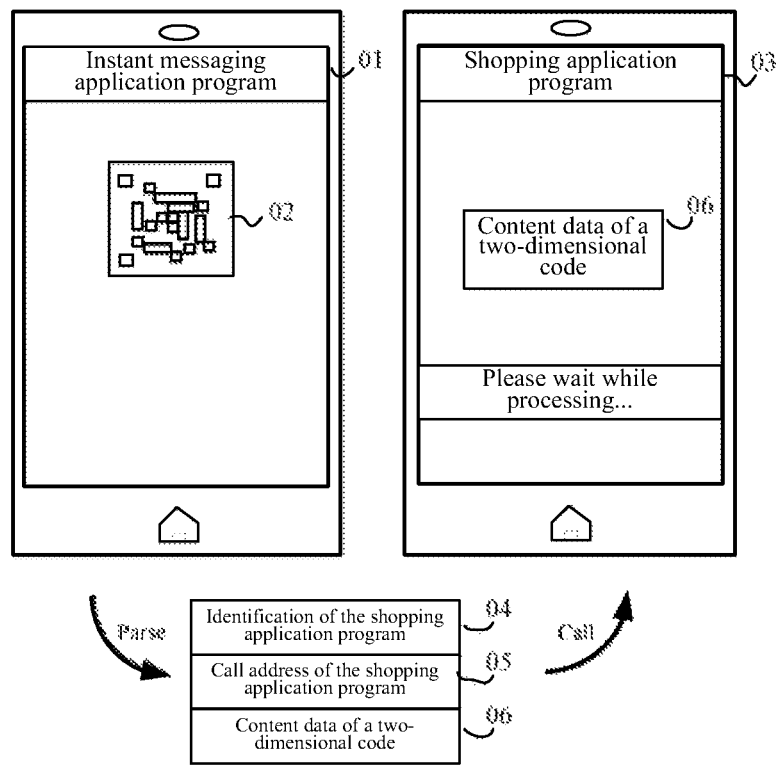
FIG. 2F depicts an exemplary processing of a graphical code, according to an embodiment of the disclosure.

FIG. 2F depicts an exemplary processing of a graphical code, according to an embodiment of the disclosure. As shown in FIG. 2F, an instant messaging application program (01) may scan a two-dimensional code (02) of a commodity. The two-dimensional code (02) of the commodity is generated according to a rule of a shopping application program (03), which is different from a rule of the instant messaging application program (01). The two-dimensional code (02) of the commodity may carry an identification (04) of the shopping application program corresponding to the two-dimensional code of the commodity, a call address (05) of the shopping application program and content data (06) of the two-dimensional code.

The instant messaging application program (01) may parse the identification (04) of the shopping application program corresponding to the two-dimensional code of the commodity, the call address (05) of the shopping application program and the content data (06) of the two-dimensional code from the two-dimensional code (02) of the commodity. The instant messaging application program (01) may detect that the identification (04) of the shopping application program is inconsistent with its own identification, then calls the shopping application program (03) according to the call address (05) of the shopping application program, and sends the content data (06) of the two-dimensional code to the shopping application program (03), and the shopping application program (03) processes the content data (06) of the two-dimensional code.

In addition to the hove implementation manners of acquiring and using a graphical code, when a webpage may be browsed through a graphical code, if a generation rule of content data in a current graphical code does not match a rule corresponding to a current application program, the current application program may call a browser application program corresponding to the graphical code to browse the webpage corresponding to the graphical code when payment is performed through as graphical code. If a generation rule of content data in a current graphical code does not match a rule corresponding to a current application program, the current application program may call as payment application program corresponding to the graphical code to perform a payment operation when a graphical code is uploaded. If a current application program does not support upload of the graphical code, the current application program may call an application program supporting upload of the graphical code to upload the graphical code.

The following embodiments illustrate exemplary apparatus of the present disclosure, and reference may be made to the preceding described corresponding processes without further detail description.

Figure 3:
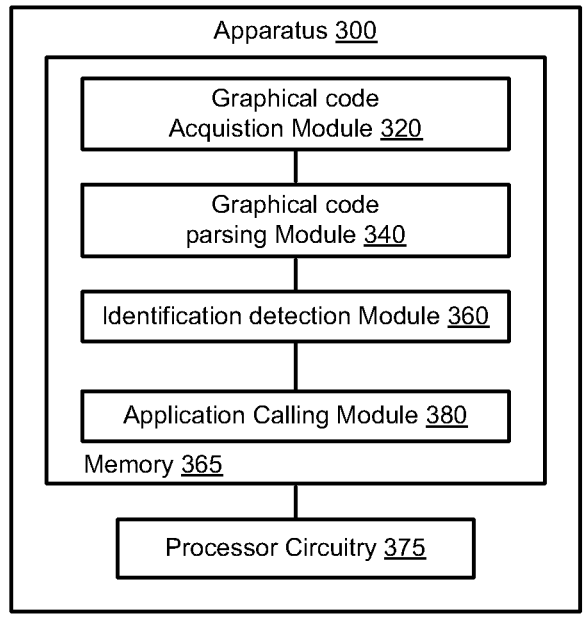
FIG. 3 is an exemplary schematic structural view of a graphical code processing apparatus or device, according to an embodiment of the disclosure.

FIG. 3 is an exemplary schematic structural view of a graphical code processing apparatus or device (300), according to an embodiment of the disclosure. The apparatus (300) includes at least a processor (375) with circuitry operating in conjunction with at least a memory (365) which stores instruction codes operable as plurality of modules, wherein the plurality of modules include a graphical code acquisition module (320), a graphical code parsing module (340), an identification detection module (360) and an application calling module (380).

Referring to FIG. 3, FIG. 3 is a schematic structural view of a graphical code processing apparatus according to an embodiment of the present disclosure. The graphical code processing apparatus includes: a graphical code acquisition module 320, a graphical code parsing module 340, an identification detection, module 360 and an application calling module 380.

The graphical code acquisition module (320) causes the processor (375) to perform: acquiring, a predetermined graphical code, wherein the predetermined graphical code carries at least: an identification of a predetermined application program corresponding to the predetermined graphical code, wherein the identification is used for uniquely identifying the predetermined application program in an operating system; a call address of the predetermined application program, wherein the call address is a call address of the predetermined graphical code in the operating system; and content data, wherein the content data is data generated according to a rule corresponding to the predetermined application program;

The graphical code parsing module (340) causes the processor (375) to perform: parsing the identification of the predetermined application program, the call address of the predetermined application program and the content data from the predetermined graphical code acquired by the graphical code acquisition module (320).

The identification detection module (360) causes the processor (375) to perform: detecting whether the identification of the predetermined application program matches an identification of a current application program.

The application calling module (380) causes the processor (375) to perform: calling the predetermined application program according to the call address of the predetermined application program in order to perform corresponding operations on the content data in the predetermined graphical code, it a detection result shows that the identification of the predetermined application program does not match the identification of the current application program.

To stun up, the plurality of modules in the graphical code processing apparatus (300) causes the processor (375) to perform: acquiring a predetermined graphical code; parsing an identification of the predetermined application program, a call address of the predetermined application program and content data from the predetermined graphical code; detecting whether the identification of the predetermined application program matches an identification of a current application program; and calling the predetermined application program according to the call address of the predetermined application program to perform corresponding operations on the content data in the predetermined graphical code, if a detection result detected by the identification detection module (360) shows that the identification of the predetermined application program does not match the identification of the current application program.

The plurality of modules in the graphical code processing apparatus (300) may solve the following compatibility problem of even if the content data carried in the graphical code may be content data generated according to the rule of another application program, the current application program may call the corresponding another application program to process the content data, thereby solving the current application program's compatibility issue with the another application program.

Figure 4:
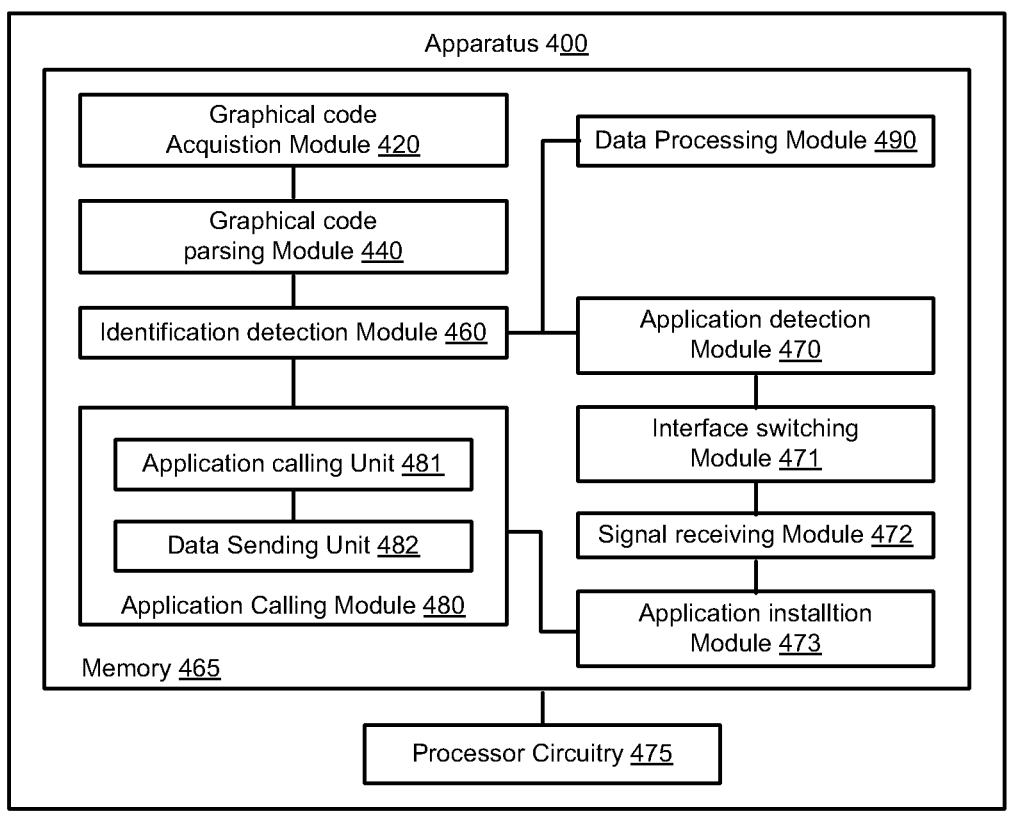
FIG. 4 is an exemplary schematic structural view of a graphical code processing apparatus or device, according to an embodiment of the disclosure.

FIG. 4 is an exemplary schematic structural view of a graphical code processing apparatus or device (400), according to an embodiment of the disclosure. The graphical code processing apparatus (400) is similar in construction to the graphical code processing apparatus (300) in FIG. 3, except with additional details and additional modules.

For example, the graphical code acquisition module (420), the graphical code parsing module (440), the identification detection module (460) each perform similar or equivalent functions as the graphical code acquisition module (320), the graphical code parsing module (340), and the identification detection module (360), respectively. No further description would be provided.

More specifically, the application calling module (480) further includes an application calling unit (481) and a data sending unit (482).

The application calling unit (481) causes the processor (475) to perform: calling the predetermined application program according to the call address of the predetermined application program; and the data sending unit (482) causes the processor (475) to perform: sending the content data of the predetermined graphical code to the called predetermined application program, so that the predetermined application program performs corresponding operations on the content data of the predetermined graphical code according to the rule corresponding to the predetermined application program.

If the predetermined graphical code further carries download information of the predetermined application program, the graphical code processing apparatus (400) further includes: an application detection module (470) and an interface switching module (471).

The application detection module (470) causes the processor (475) to perform: detecting whether the predetermined application program has been installed; and the interface switching module (471) causes the processor (475) to perform: prompting for download according to the download information of the predetermined application program, if a detection result shows that the predetermined application program has not been installed.

The graphical code processing apparatus further includes: a signal receiving module (472) and an application installation module (473).

The signal receiving module (472) causes the processor (475) to perform: receiving an acknowledgement signal for downloading the predetermined application program; and the application installation module (473) causes the processor (475) to perform: downloading and installing the predetermined application program.

Furthermore, the application calling module (480) causes the processor (475) to perform: calling the predetermined application program downloaded and installed according to the call address of the predetermined application program in order to perform corresponding operations on the content data in the predetermined graphical code.

In addition, the graphical code processing apparatus (400) further includes: a data processing module (490), which causes the processor (475) to perform: performing corresponding operations on the content data in the predetermined graphical code through the current application program according to a rule corresponding to the current application program, if the detection result shows that the identification of the predetermined application program matches the identification of the current application program.

To sum up, the plurality of modules in the graphical code processing apparatus (400) causes the processor (475) to perform: acquiring a predetermined graphical code; parsing an identification of the predetermined application program, a call address of the predetermined application program and content data from the predetermined graphical code; detecting whether the identification of the predetermined application program matches an identification of a current application program; and calling the predetermined application program according to the call address of the predetermined application program to perform corresponding operations on the content data in the predetermined graphical code, if a detection result detected by the identification detection module (460) shows that the identification of the predetermined application program does not match the identification of the current application program.

The plurality of modules in the graphical code processing apparatus (400) may solve the hallowing compatibility problem of even if the content data carried in the graphical code may be content data generated according to the rule of another application program, the current application program may call the corresponding another application program to process the content data, thereby solving the current application program's compatibility issue with the another application program.

Figure 5:
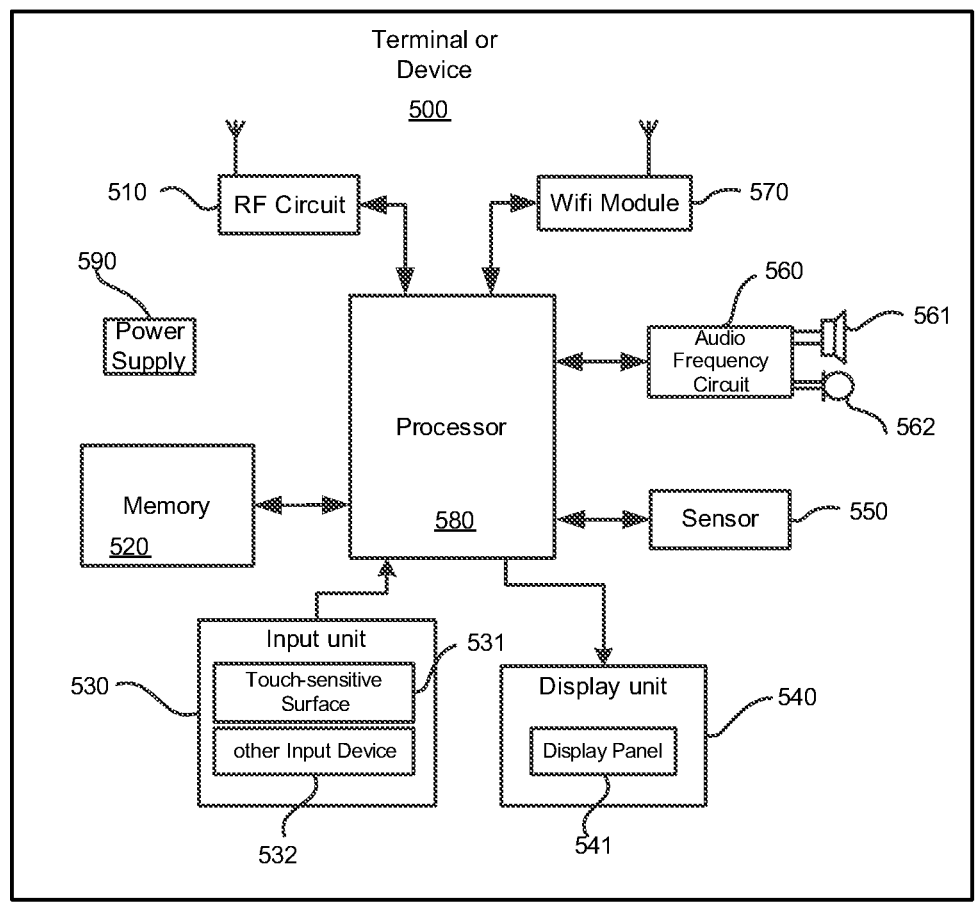
FIG. 5 is an exemplary schematic structural view of a graphical code processing terminal according to an embodiment of the disclosure.

FIG. 5 is an exemplary schematic structural view of a graphical code processing terminal (500), according to an embodiment of the disclosure. The mobile terminal 500 may include a communication unit (510), a memory (520) including one or more computer readable storage media, an input unit (530), a display unit (540), a sensor (550) an audio circuit 560, a wireless communication unit (570), a processor (580) including one or more processing cores, a power source 590 and other components. The mobile terminal (500) may be a mobile terminal including a camera, and a mobile application client such as a wechat client and a QQ client is installed on the mobile terminal. Persons skilled in the art may understand that, the structure of the mobile terminal shown in FIG. 5 does not limit the mobile terminal, which may include components more or less than those illustrated, or combine some components, or have different component arrangements.

The communication unit (510) may be used for receiving and sending signals during information receiving and sending or a call, and particularly, handing over the downlink information to one or more processor (580) for processing after receiving downlink information of a base station; in addition, sending data involving uplink to the base station. Usually, the communication unit (510) includes, but is not limited to, an antenna, at least one amplifier, a tuner, one or more oscillators, a Subscriber Identity Module (SIM) card, a transceiver, a coupler, a Low Noise Amplifier (LNA), a duplexer and the like. In addition, the communication unit (510) may also communicate with other devices by using wireless communication and a network. The wireless communication may use any communication standard or protocol, which includes, but is not limited to, Global System of Mobile communication (GSM), General Packet Radio Service (GPRS), Code Division Multiple Access (CDMA), Wideband Code Multiple Access (WCDMA), Long Term Evolution (LTE), e-mails, Short Messaging Service (SMS) and the like. The memory (520) may be used for storing software programs and modules, for example, the memory (520) may be used for storing software programs acquiring speech signals, software programs implementing keyword recognition, software programs implementing continuous speech recognition, software programs implementing setting of reminders and the like. The processor (580) executes various functional applications and data processing by running the software programs and modules stored in the memory (520). The memory (520) may mainly include a program storage area and a data storage area, where the program storage area may store an operating system, an application program required by at least one function (such as a voice playback function, or an image playback function); the data storage area may store data (such as audio data or a phone book) created according to use of the mobile terminal (500). In addition, the memory (520) may include a high-speed random access memory, and may further include a nonvolatile memory, for example, at least one magnetic disk storage device, a flash memory device, or other volatile solid-state storage devices. Correspondingly, the memory (520) may further include a memory controller, to provide access of the processor (580) and the input unit (530) to the memory (520).

The input unit (530) may be used for receiving input numerical information or character information, and generating keyboard, joystick, optical or trackball signal input relevant to user setting and function control. Specifically, the input unit (530) may include a touch-sensitive surface (531) and another input device (532). The touch-sensitive surface (531), also called a touchscreen or a touch panel, may collect a touch operation of the user thereon or nearby (for example, an operation of the user on the touch-sensitive surface (531) or near the touch-sensitive surface (531) with a finger, a stylus, and any other suitable object or accessory), and drive a corresponding connection apparatus according to a preset program. Optionally, the touch-sensitive surface (531) may include a touch detection apparatus and a touch controller. The touch detection apparatus detects a position touched by the user, detects a signal brought about by the touch operation, and transmits the signal to the touch controller the touch controller receives touch information from the touch detection apparatus, converts the touch information into a contact coordinate, and then sends the contact coordinate to the processor (580), and may receive a command sent by the processor (580) and execute the command. In addition, the touch-sensitive surface (531) may be implemented with multiple types such as resistive, capacitive, infrared, and surface acoustic wave types. In addition to the touch-sensitive surface (531), the input unit (530) may also include another input device (532). Specifically, the another input device (532) may include, but is not limited to, one or more of a physical keyboard, a function key (such as a volume control key or a switch key), a trackball, and a joystick.

The display unit (540) may be used for displaying information input by the user or information provided for the user and various graphical user interfaces of the mobile terminal 500, where the graphical user interfaces may be formed by graphics, texts, icons, videos and any combination thereof. The display unit (540) may include a display panel (541), and optionally, the display panel (541) may be configured in forms such as a Liquid Crystal Display (LCD) or an Organic Light-Emitting Diode (OLED). Further, the touch-sensitive surface (531) may cover the display panel (541), and after detecting the touch operation thereon or nearby, the touch-sensitive surface (531) transmits the touch operation to the processor (580) to determine the type of a touch event, and then the processor (580) provides corresponding visual output on the display panel (541) according to the type of the touch event. Although in FIG. 5, the touch-sensitive surface (531) and the display panel (541) implement input and input functions as two separate members, in some embodiments, the touch-sensitive surface (531) and the display panel 541 may be integrated to implement input and output functions.

The mobile terminal (500) may further include at least one sensor (550), for example, an optical sensor, a motion sensor and other sensors. Specifically, the optical sensor may include an ambient light sensor and a proximity sensor, where the ambient light sensor may adjust brightness of the display panel (541) according to brightness of ambient light, and the proximity sensor may close the display panel (541) and/or backlight when the mobile terminal (500) moves to the ear. As one kind of the motion sensor, a gravity accelerometer may detect the size of acceleration in various directions (generally triaxial), may detect the magnitude and direction of gravity in the stationary state, and may be used for recognizing applications of a cell phone posture (such as horizontal and vertical screen switching, related games, or magnetometer posture calibration), may vibrate to recognize relevant functions (for example, a pedometer, or tapping) and the like; other sensors such as a gyroscope, a barometer, a hygrometer, a thermometer, and an infrared sensor that may be configured on the mobile terminal 500 are not repeated herein.

The audio circuit (560), a loudspeaker (561), and a microphone (562) may provide an audio interface between the user and the mobile terminal 500. The audio circuit (560) may convert received audio data into an electric signal, and then transmit the electric signal to the loudspeaker (561); and the loudspeaker (561) converts the electric signal into a sound signal for output. On the other hand, the microphone (562) converts the collected sound signal into an electric signal, and the audio circuit (560) receives the electric signal and then converts the electric signal into audio data; after being output to the processor (580) for processing, the audio data is sent to another mobile terminal through the communication unit (510), or the audio data is output to the memory (520) for further processing. The audio circuit (560) may further include an earphone jack, to provide communication between a peripheral headset and the mobile terminal (500).

The wireless communication unit (570) may be a wireless fidelity (WiFi) module or a Bluetooth module. The mobile terminal (500) may help the user to send and receive an e-mail, browse webpages and access streaming media through the wireless communication unit (570), which provides wireless broadband Internet access for the users. Although FIG. 5 shows the wireless communication unit (570), but it may be understood that, the wireless communication unit (570) is not as necessary component of the mobile terminal (500), and may be completely saved without changing the essential scope of the disclosure as required.

The processor 580 is a control center of the mobile terminal (500), connects various parts of the whole mobile terminal by using various interfaces and lines, and executes various functions of the mobile terminal (500) and processes data by running or executing software programs and/or modules stored in the memory (520), and invoking data stored in the memory (520), thereby monitoring an electronic device as a whole. Optionally, the processor (580) may include one or more processing cores; optionally, the processor (580) may integrate an application processor and a modem processor, where the application processor mainly processes the operating system, user interfaces and application programs, and the modem processor mainly processes wireless communication. It may be understood that, the modem processor may not be integrated into the processor (580).

The mobile terminal 500 may further include a power source (590) (for example, a battery) supplying power for various parts, and optionally, the power source may be logically connected to the processor (580) through a power management system, so as to achieve functions of charging management, discharging management, and power consumption management through the power management system. The power source (590) may further include one or more DC or AC power sources, a recharging, system, a power failure detection circuit, a power converter or inverter, a power status indicator and any other components.

Although not shown, the mobile terminal (500) may also include a camera, a Bluetooth module and the like, which is not repeated herein.

The mobile terminal (500) further includes a memory, and one or more programs, where the one or more programs are stored in the memory.

In addition, the method according to the present disclosure may also be implemented as a computer program executed by a CPU, where the computer program may be stored in a computer readable storage medium. When the computer program is executed by the CPU, the above functions defined in the method of the present disclosure are executed.

Besides, the steps of the methods and system units may also be implemented by using a controller and a computer readable storage medium for storing computer programs enabling the controller to implement the steps or functions of the units.

In addition, it should be understood that, the computer readable storage medium (for example, a memory) herein may be a volatile memory or a non-volatile memory, or may include both a volatile memory and a non-volatile memory. As an example instead of being restrictive, the non-volatile memory may include a Read Only Memory (ROM), a Programmable ROM (PROM), an Electrically Programmable ROM (EPROM), an Electrically Erasable Programmable ROM (EEPROM) or a flash memory. The volatile memory may include Random Access Memory (RAM), and the RAM may serve as an external cache memory. As an example instead of being restrictive, the RAM may be obtained in many forms, for example, a Synchronous RAM (SRAM), a Dynamic RAM (DRAM), a Synchronous DRAM (SDRAM), a Double Data Rate SDRAM (DDR SDRAM), an Enhanced SDRAM (ESDRAM), a Synchronous Link DRAM (SLDRAM) and a Direct RambusRAM (DRRAM). The storage devices disclosed intend to include, but are not limited to these and other suitable types of memories.

Persons skilled in the art may further understand that, in combination with various illustrative logical blocks, modules, circuits and algorithm steps described herein in the disclosure, the functions may be implemented as electronic hardware, computer software or a combination thereof. In order to clearly describe such interchangeability between hardware and software, it has been generally described with functions of various illustrative components, blocks, modules, circuits and steps. Whether such functions are implemented as software or implemented as hardware depends on specific applications and design constraints imposed to the whole system. Persons skilled in the art may implement the functions in various manners for each specific application, but such an implementation decision should not be interpreted as causing a departure from the scope of the present disclosure.

In combination with various illustrative logical blocks, modules and circuits described herein in the disclosure, the following components designed for executing the functions herein may be used for implementation or execution: as general purpose processor, a Digital Signal Processor (DSP), an Application Specific Integrated Circuit (ASIC), a Field Programmable Gate Array (FPGA) or other programmable logic devices, discrete gates or transistor logic, discrete hardware components or any combination of the components. The general purpose processor may be a microprocessor, but, alternatively, the processor may be any traditional processor, controller, micro controller or state machine. The processor may also be implemented as a combination of computing devices, for example, a combination of a DSP and a microprocessor, a plurality of microprocessors, a combination of one or more microprocessors and a DSP core, or any other such configurations.

In combination with the steps of the method or algorithm described herein in the disclosure, the functions may be directly included in hardware, in a software module executed by the processor or a combination thereof. The software module may reside in a RAM memory, a flash memory, a ROM memory, an EPROM memory, an EEPROM memory, a register, a hard disk, a removable disc, a CD-ROM, or any other forms of storage media known in this field. An exemplary storage medium is coupled to the processor, so that the processor can read information from the storage medium or write information into the storage medium. In an alternative solution, the storage medium may be integrated together with the processor. The processor and the storage medium may reside in an ASIC. The ASIC may reside in a user terminal. In an alternative solution, the processor and the storage medium may reside in the user terminal as discrete components.

In one or more exemplary designs, the functions may be implemented in hardware, software, firmware or any combination thereof. If implemented in software, the functions may be taken as one or more instructions or codes to be stored on a computer readable medium or to be transmitted through a computer readable medium. The computer readable medium includes a computer storage medium and a communication medium, where the communication medium includes any medium that helps to transmit a computer program from one position to another position. The storage medium may be any available medium that may be accessed by a general purpose or special purpose computer. As an example instead of being restrictive, the computer readable medium may include a RAM, a ROM, an EEPROM, a CD-ROM or other optical storage devices, magnetic disk storage devices or other magnetic storage devices, or may be any other media which are used for carrying or storing required program codes in the form of instructions or data structures and may be accessed by a general purpose or special purpose computer or a general purpose or special purpose processor. In addition, any connection may be suitably called a computer readable medium. For example, if a coaxial cable, fiber optic cable, twisted pair, digital subscriber line (DSL) or wireless technology such as infrared, radio or microwave is used to send software from a website, a server or other remote sources, the coaxial cable, fiber optic cable, twisted pair, DSL or wireless technology such as infrared, radio or microwave is included in the definition of medium. As used herein, a magnetic disk and an optical disc include a compact disc (CD), a laser disc, a digital versatile disc (DVD), a floppy disc and a blu-ray disc, where the magnetic disk usually reproduces data magnetically, while the optical disc uses lasers to reproduce the data optically. A combination of the content should also be included in the scope of the computer readable medium.

The sequence numbers of the above-mentioned embodiments may be intended only for description, instead of indicating the relative merits of the embodiments. It should be understood by those with ordinary skill in the art which all or some of the steps of the foregoing embodiments may be implemented by hardware, or software program codes stored on a non transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive, ROM or flash memory. The computer-executable commands may be which is which is enabled to enable a computer, server, a smart phone, a tablet or any similar computing device to perform graphical code processing.

The foregoing represents only some preferred embodiments of the present disclosure and their disclosure may not be construed to limit the present disclosure in any way. Those of ordinary skill in the art will recognize which equivalent embodiments may be created via slight alterations and modifications using the technical content disclosed above without departing from the scope of the technical solution of the present disclosure, and such summary alterations, equivalent has changed and modifications of the foregoing present disclosure.

What is claimed is:

1. A graphical code processing method, comprising:
   acquiring a predetermined graphical code, wherein the predetermined graphical code carries at least:
   an identification of a predetermined application program corresponding to the predetermined graphical code, wherein the identification is used for uniquely identifying the predetermined application program in an operating system;
   a call address of the predetermined application program, wherein the call address is a call address of the predetermined graphical code in the operating system; and
   content data, wherein the content data are data generated according to a rule corresponding to the predetermined application program;
   parsing the identification of the predetermined application program, the call address of the predetermined application program and the content data from the predetermined graphical code; and
   detecting whether the identification of the predetermined application program matches an identification of a current application program; if a detection result shows that the identification of the predetermined application program does not match the identification of the current application program, calling the predetermined application program according to the call address of the predetermined application program in order to perform corresponding operations on the content data in the predetermined graphical code.

2. The method according to claim 1, wherein the calling of the predetermined application program according to the call address of the predetermined application program in order to perform the corresponding operations on the content data in the predetermined graphical code, comprises:
   calling the predetermined application program according to the call address of the predetermined application program; and
   sending the content data of the predetermined graphical code to the called predetermined application program, so that the predetermined application program performs corresponding operations on the content data of the predetermined graphical code according to the rule corresponding to the predetermined application program.

3. The method according to claim 1, wherein, if the predetermined graphical code further carries download information of the predetermined application program, the method comprises:
   prior to the calling of the predetermined application program according to the call address of the predetermined application program to perform corresponding operations on the content data in the predetermined graphical code:
   detecting whether the predetermined application program has been installed; and
   prompting for download according to the download information of the predetermined application program, if a detection result shows that the predetermined application program has not been installed.

4. The method according to claim 3, wherein, after the prompting for download according to the download information of the predetermined application program, the method further comprises:
   receiving an acknowledgement signal for downloading the predetermined application program;
   downloading and installing the predetermined application program; and
   calling the predetermined application program downloaded and installed according to the call address of the predetermined application program in order to perform corresponding operations on the content data in the predetermined graphical code.

5. The method according to claim 1, wherein, alter the detecting whether the identification of the predetermined application program matches an identification of a current application program, the method comprises:
   if the detection result shows that the identification of the predetermined application program matches the identification of the current application program, performing corresponding operations on the content data in the predetermined graphical code through the current application program according to a rule corresponding to the current application program.

6. A graphical code processing apparatus, wherein the apparatus comprises at least a processor with circuitry operating in conjunction with at least a memory which stores instruction codes operable as plurality of modules, wherein the plurality of modules comprise:
   a graphical code acquisition module, which causes the processor to perform; acquiring a predetermined graphical code, wherein the predetermined graphical code carries at least:
   an identification of a predetermined application program corresponding to the predetermined graphical code, wherein the identification is used for uniquely identifying the predetermined application program in an operating system;
   a call address of the predetermined application program, wherein the call address is a call address of the predetermined graphical code in the operating system; and content data, wherein the content data are data generated according to a rule corresponding to the predetermined application program;
a graphical code parsing module, which causes the processor to perform: parsing the identification of the predetermined application program, the call address of the predetermined application program and the content data from the predetermined graphical code;
an identification detection module, which causes the processor to perform: detecting whether the identification of the predetermined application program matches an identification of a current application program; and
an application calling module, which causes the processor to perform: calling the predetermined application program according to the call address of the predetermined application program in order to perform corresponding operations on the content data in the predetermined graphical code, if a detection result shows that the identification of the predetermined application program does not match the identification of the current application program.

7. The apparatus according to claim 6, wherein the application calling module comprises: an application calling unit and a data sending unit;
wherein the application calling unit causes the processor to perform: calling the predetermined application program according to the call address of the predetermined application program; and
the data sending unit causes the processor to perform: sending the content data of the predetermined graphical code to the called predetermined application program, so that the predetermined application program performs corresponding operations on the content data of the predetermined graphical code according to the rule corresponding to the predetermined application program.

8. The apparatus according to claim 6, wherein, if the predetermined graphical code further carries download information of the predetermined application program, the apparatus further comprises:
an application detection module, which causes the processor to perform: detecting whether the predetermined application program has been installed; and
an interface switching module, which causes the processor to perform: prompting for download according to the download information of the predetermined application program, if a detection result shows that the predetermined application program has not been installed.

9. The apparatus according to claim 6, wherein the apparatus further comprises:
a signal receiving module, which causes the processor to perform: receiving an acknowledgement signal for downloading the predetermined application program:
an application installation module, which causes the processor to perform: downloading and installing the predetermined application program; and
the application calling module, which causes the processor to perform: calling the predetermined application program downloaded and installed according to the call address of the predetermined application program in order to perform corresponding operations on the content data in the predetermined graphical code.

10. The apparatus according to claim 6, wherein the apparatus comprises:
a data processing module, which causes the processor to perform: performing corresponding operations on the content data in the predetermined graphical code through the current application program according to a rule corresponding, to the current application program, if the detection result shows that the identification of the predetermined application program matches the identification of the current application program.

11. A non-transitory computer-readable storage medium, wherein the computer readable storage medium stores a program which comprises codes or instructions to cause a processor circuitry to execute operations for processing graphical code, the operations comprising:
acquiring a predetermined graphical code, wherein the predetermined graphical code carries at least:
an identification of a predetermined application program corresponding to the predetermined graphical code, wherein the identification is used for uniquely identifying the predetermined application program in an operating system;
a call address of the predetermined application program, wherein the call address is a call address of the predetermined graphical code in the operating system; and
content data, wherein the content data are data generated according to a rule corresponding to the predetermined application program;
parsing the identification of the predetermined application program, the call address of the predetermined application program and the content data from the predetermined graphical code; and
detecting whether the identification of the predetermined application program matches an identification of a current application program; if a detection result shows that the identification of the predetermined application program does not match the identification of the current application program, calling the predetermined application program according to the call address of the predetermined application program in order to perform corresponding operations on the content data in the predetermined graphical code.

12. The non-transitory computer-readable storage medium according to claim 11, wherein the calling of the predetermined application program according to the call address of the predetermined application program in order to perform the corresponding operations on the content data in the predetermined graphical code, comprises;
calling the predetermined application program according to the call address of the predetermined application program; and
sending the content data of the predetermined graphical code to the called predetermined application program, so that the predetermined application program performs corresponding operations on the content data of the predetermined graphical code according to the rule corresponding to the predetermined application program.

13. The non-transitory computer-readable storage medium according to claim 11, wherein, if the predetermined graphical code further carries download information of the predetermined application program, the method comprises:
prior to the calling of the predetermined application program according to the call address of the predetermined application program to perform corresponding operations on the content data in the predetermined graphical code:
detecting whether the predetermined application program has been installed; and prompting for download according to the download information of the predetermined application program, if as detection result shows that the predetermined application program has not been installed.

14. The non-transitory computer-readable storage medium according to claim 13, wherein, after the prompting for download according to the download information of the predetermined application program, the method further comprises:

receiving an acknowledgement signal for downloading the predetermined application program;

downloading and installing the predetermined application program; and calling the predetermined application program downloaded and installed according to the call address of the predetermined application program in order to perform corresponding operations on the content data in the predetermined graphical code.

15. The non-transitory computer-readable storage medium according to claim 11, wherein, after the detecting whether the identification of the predetermined application program matches an identification of a current application program, the method comprises:

if the detection result shows that the identification of the predetermined application program matches the identification of the current application program, performing corresponding operations on the content data in the predetermined graphical code through the current application program according to a rule corresponding to the current application program.

* * * * *

UNITED STATES PATENT AND TRADEMARK OFFICE
CERTIFICATE OF CORRECTION

PATENT NO. : 9,589,167 B2
APPLICATION NO. : 15/165588
DATED : March 7, 2017
INVENTOR(S) : Zhigang Song It is certified that error appears in the above-identified patent and that said Letters Patent is hereby corrected as shown below:

On the Title Page

Right column, Line 13, item (57), under "ABSTRACT", after "that the identification" replace "a the predetermined" with --of the predetermined--.

In the Claims

In Column 18, Claim 5, Line 39, after "to claim 1, wherein," replace "alter the" with --after the--.

Signed and Sealed this
Twenty-seventh Day of August, 2019

Andrei Iancu
*Director of the United States Patent and Trademark Office*